United States Patent
Pati et al.

(10) Patent No.: US 10,339,376 B2
(45) Date of Patent: Jul. 2, 2019

(54) SYSTEM AND METHOD FOR AUTOMATED PROCESSING OF ELECTRONIC DOCUMENTS

(71) Applicant: Cognizant Technology Solutions India Pvt. Ltd., Chennai (IN)

(72) Inventors: Peeta Basa Pati, Bangalore (IN); Srinivas Nagamalla, Karimnagar (IN); Harish Kongara, Tirupathi (IN); Ejiribidi Rajeshekhar Rao, Bangalore (IN); Ravi Veera, Nizambad (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 344 days.

(21) Appl. No.: 14/481,296

(22) Filed: Sep. 9, 2014

(65) Prior Publication Data
US 2015/0379342 A1    Dec. 31, 2015

(30) Foreign Application Priority Data

Jun. 25, 2014    (IN) .......................... 3086/CHE/2014

(51) Int. Cl.
*G06K 9/00*    (2006.01)
*G07D 7/12*    (2016.01)
*G06K 9/20*    (2006.01)

(52) U.S. Cl.
CPC ....... *G06K 9/00463* (2013.01); *G06K 9/2063* (2013.01); *G07D 7/12* (2013.01)

(58) Field of Classification Search
CPC ..... G06K 9/00463; G07D 7/12; G07K 9/2063

(Continued)

(56) References Cited

U.S. PATENT DOCUMENTS 5,898,157 A    4/1999   Mangili et al.
6,104,500 A *  8/2000   Alam ................... H04N 1/0036
                                                          358/1.15

(Continued)

OTHER PUBLICATIONS

"Detection of Courtesy Amount Block on Bank Checks;" Agarwal et al; <http://citeseerx.ist.psu.edu/viewdoc/download?doi=10.1.1.45.5353&rep=rep1&type=pdf>; Published Jul. 1, 2002.*

(Continued)

*Primary Examiner* — Stephen S Hong
*Assistant Examiner* — Broderick C Anderson
(74) *Attorney, Agent, or Firm* — Cantor Colburn LLP

(57) ABSTRACT

In accordance with an aspect of the present invention, a system and method for automated processing of electronic documents is provided. The said system comprising a precursor module configured to receive an electronic document and convert into a textual equivalent; a data ascertainment module configured to identify the textual snippets, more particularly, the demarcated sections, corresponding to the at least one structured section and logically separate the demarcated sections the remaining textual equivalent; and, a pass-receiving module configured to receive said logically separated demarcated sections and the remaining textual equivalent and capture business relevant data committed therein, wherein said pass-receiving module captures the business relevant data from the demarcated sections by locating at least one master trigger and at least one proximate co-trigger in the demarcated sections and geometrically coupling said located triggers and co-triggers into at least one potential zone and extracting the business relevant data committed within these potential zones.

18 Claims, 20 Drawing Sheets

(58) Field of Classification Search
USPC .......................................................... 715/243
See application file for complete search history.

(56) References Cited

U.S. PATENT DOCUMENTS

| | | | | |
|---|---|---|---|---|
| 7,561,734 | B1* | 7/2009 | Wnek | G06F 17/243 |
| | | | | 382/159 |
| 8,452,689 | B1 | 5/2013 | Medina, III | |
| 9,087,354 | B1* | 7/2015 | Hambir | G06Q 30/0601 |
| 9,361,076 | B1* | 6/2016 | Veliah | G16H 10/60 |
| 2002/0195485 | A1* | 12/2002 | Pomerleau | G06Q 20/04 |
| | | | | 235/379 |
| 2006/0045322 | A1* | 3/2006 | Clarke | G06K 9/186 |
| | | | | 382/137 |
| 2007/0086642 | A1 | 4/2007 | Foth et al. | |

OTHER PUBLICATIONS

"A System for Processing Handwritten Bank Checks Automatically;" Palacios et al; <http://citeseerx.ist.psu.edu/viewdoc/download?doi=10.1.1.97.7137&rep=rep1&type=pdf>; Published: Mar. 1, 2002.*
"OCR PDF Output Xml;" cvision; <http://www.cvisiontech.com/library/ocr/ocr-pdf/ocr-pdf-output-xml.html>; Published: Apr. 29, 2013.*
Carl Felsenfeld, "The Check Clearing for the 21st Century Act—A Wrong Turn in the Road to Improvement of the U.S. Payments System", Social Science Research Network (SSRN), FLASH: The Fordham Law Archive of Scholarship and History, 2006, pp. 1-70.
Dias. D., De Queroz., "A Model for Electronic Representation of Bank Checks", Institute of Electrical and Electronic Engineers (IEEE), pp. 1-4.

* cited by examiner

| Trigger List | Trigger Type |
|---|---|
| PAY | MASTER TRIGGER |
| PAY TO | MASTER TRIGGER |
| PAY TO THE ORDER | MASTER TRIGGER |
| AUTHORIZED | CO-TRIGGER |
| SIGNATURE | CO-TRIGGER |
| VOID | MASTER TRIGGER |
| VOID UNLESS | MASTER TRIGGER |
| VOID AFTER 60 DAYS | CO-TRIGGER |
| VOID AFTER 90 DAYS | CO-TRIGGER |
| VOID WITHOUT | CO-TRIGGER |
| THIS IS CHECK IS VOID | CO-TRIGGER |
| CHECK NUMBER | CO-TRIGGER |
| CHECK DATE | CO-TRIGGER |
| AMOUNT | CO-TRIGGER |
| DOLLARS | CO-TRIGGER |
| DATE | CO-TRIGGER |

FIG. 5

| Trigger | Co-trigger |
|---|---|
| PAY | DOLLAR |
| PAY TO | CHECK, DOLLAR |
| PAY TO THE ORDER | |
| AUTHORIZED | SIGNATURE |
| SIGNATURE | DATE |
| VOID | VOID WITHOUT DATE |

FIG. 8

| Trigger | Co-trigger | Validation Outcome |
|---|---|---|
| PAY | DOLLAR | VALID |
| PAY TO | CHECK, DOLLAR | VALID |
| PAY TO THE ORDER | SIGNATURE | INVALID |
| AUTHORIZED | DATE | INVALID |
| SIGNATURE | VOID WITHOUT | VALID |
| VOID | DATE | VALID |

FIG. 11

| Template | Data Field | Extraction Type | Pre_Gazetteer | REG-EX Pattern | Post_Gazetteer |
|---|---|---|---|---|---|
| MTG1 | TRUSTEE | CONTEXT | TRUSTEE \| BENEFICIARY | Pre_Gazetteer[space","."]+[A-Z,space]{5-100}[space]* Post_Gazetteer | |
| MTG1 | BORROWER | CONTEXT | BORROWER \| MORTGAGOR | Pre_Gazetteer\"[ ]*is[A-Z ]+Post_Gazetteer | |

FIG. 13

SYSTEM AND METHOD FOR AUTOMATED PROCESSING OF ELECTRONIC DOCUMENTS

CROSS REFERENCE TO RELATED APPLICATION

This application is related to and claims the benefit of Indian Patent Application No. 30866/CHE/2014 filed on 25 Jun. 2014, the contents of which are incorporated by reference in their entirety.

FIELD OF THE INVENTION

This invention relates, generally, to the field of processing electronic documents and more particularly, to the field of processing composite electronic documents comprising at least one of: structured section or unstructured section, and extracting, transforming, improving and delivering the data committed therein.

BACKGROUND OF THE INVENTION

Automated Document Processing Systems (ADPSs) provide a complete solution to process Documents and use the data therein. Presently, various systems are available to cater to the needs of the users in this space.

One class of state-of-the-art ADPSs involves placing one or more constraints on the document to be processed. A prior art ADPS, for instance, involves constraining the input Document in terms of its color configuration. Said systems accepts those electronic documents as input which have a specific color depth and resolution (e.g. 200 to 300 DPI). This unique color configuration enables the APDS to capture relevant business data from the electronic documents by applying various color-based analysis techniques such as grayscale coding. Yet another prior art ADPS accepts format-specific structured document such as Negotiable Instruments, Bills & Invoices, Conveyance Documents etc., and captures business relevant data from the said documents. This format consistency in the inputs enables a reader (e.g. OCR Reader) to probe through preset locations/co-ordinates and extract relevant soft data committed therein.

One other class of the state-of-the-art ADPSs involves placing one or more constraints on the manner in which the input document interacts with the ADPS. A prior art ADPS for processing structured documents, for instance, constrains the interaction between said ADPS and the input Document by fixing the 'input count per cycle' to 1. Said system accepts only single structured document per process cycle and operates upon it. Therefore, in each process cycle, it fetches a single 'separate scanned document' as input, processes said input and extracts business relevant data committed therein.

The aforementioned ADPSs, inter alia, have a disadvantage of yielding the desired results only when one or more constraints or conditions are met. The solution to said disadvantage, therefore, lies in providing a one-stop automation system that would automatically be able to adjust and evolve itself according to the nature of the input document. Inter alia, said system should be able to work effectively, independent of factors such as type of electronic document and the sections therein i.e. structured and unstructured sections, number of structured sections per page of the electronic document, content alignment, extent of overlap between structured and unstructured sections, etc.

The instant invention aims at realizing and resolving said disadvantage and providing a solution in the manner indicated.

SUMMARY OF THE INVENTION

The present invention is intended to address at least the above-mentioned problems and/or disadvantages and to provide a suitable solution. Accordingly, an aspect of the present invention is to provide a system, method and computer program product for automated processing of electronic documents.

In accordance with an aspect of the present invention, an automated processing system for electronic documents is provided. The system comprising a precursor module, wherein the precursor module is configured to receive an electronic document comprising at least one of: a structured section or an unstructured section, and convert the electronic document into a textual equivalent; a data ascertainment module communicatively coupled to the precursor module, wherein the data ascertainment module is configured to: scan the textual equivalent and demarcate those sections that correspond to one or more predetermined structural attributes; and separate the one or more demarcated sections from the textual equivalent and retrieve the one or more demarcated sections and a remaining textual equivalent as distinct inputs; and a pass-receiving module communicatively coupled to the data ascertainment module, wherein the pass-receiving module is configured to: receive the one or more demarcated sections and the remaining textual equivalent as distinct inputs; identify one or more potential zones within the one or more demarcated sections, wherein the one or more potential zones are indicative of geometric regions containing business relevant data; and capture the business relevant data contained in the identified one or more potential zones and the remaining textual equivalent; wherein the pass-receiving module identifies one or more potential zones within the one or more demarcated sections by locating one or more master triggers and one or more proximate co-triggers in the demarcated sections and geometrically coupling the located master triggers and proximate co-triggers into the one or more potential zones.

In accordance with one other aspect of the present invention, a method of automated processing of electronic documents is provided. The method comprising the steps of receiving an electronic document comprising at least one of: a structured section or unstructured section, and converting the electronic document into a textual equivalent; scanning the textual equivalent and demarcating those sections that correspond to one or more predetermined structural attributes; separating the one or more demarcated sections from the textual equivalent and retrieving the one or more demarcated sections and a remaining textual equivalent as distinct inputs; identifying one or more potential zones within the one or more demarcated sections, wherein the one or more potential zones are indicative of geometric regions containing business relevant data; and capturing the business relevant data contained in the identified one or more potential zones within the one or more demarcated sections and the remaining textual equivalent; wherein the identifying one or more potential zones within the one or more demarcated sections by locating one or more master triggers and one or more co-triggers in the demarcated sections and geometrically coupling the located master triggers and co-triggers into the one or more potential zones.

In accordance with another aspect of the present invention, a computer program product comprising a non-transitory computer-readable medium having computer-readable program code stored thereon, is provided. The computer-readable program code comprising instructions that, when executed by a processor, causes the processor to trigger an automated processing system for electronic documents, wherein the system comprising a precursor module, wherein the precursor module is configured to receive an electronic document comprising at least one of: a structured section or an unstructured section, and convert the electronic document into a textual equivalent; a data ascertainment module communicatively coupled to the precursor module, wherein the data ascertainment module is configured to: scan the textual equivalent and demarcate those sections that correspond to one or more predetermined structural attributes; and separate the one or more demarcated sections from the textual equivalent and retrieve the one or more demarcated sections and a remaining textual equivalent as distinct inputs; and a pass-receiving module communicatively coupled to the data ascertainment module, wherein the pass-receiving module is configured to: receive the one or more demarcated sections and the remaining textual equivalent as distinct inputs; identify one or more potential zones within the one or more demarcated sections, wherein the one or more potential zones are indicative of geometric regions containing business relevant data; and capture the business relevant data contained in the identified one or more potential zones and the remaining textual equivalent; wherein the pass-receiving module identifies one or more potential zones within the one or more demarcated sections by locating one or more master triggers and one or more proximate co-triggers in the demarcated sections and geometrically coupling the located master triggers and proximate co-triggers into the one or more potential zones.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE ACCOMPANYING FIGURES

The above and other aspects, features, and advantages of certain exemplary embodiments of the present invention will be more apparent from the following detailed description taken in conjunction with the accompanying drawings, in which:

FIG. 5 illustrates a sample trigger gazetteer for a case where the demarcated section corresponds to an image of a Check;

FIG. 8 is a sample list of all co-triggers which are likely to exist with the master triggers in a Check;

FIG. 11 is a sample illustration of a validation record generated by the validating unit;

FIG. 13 shows an exemplary set of rules for capturing business relevant data from a Mortgage Document using Context based extraction technique;

Figure 16:
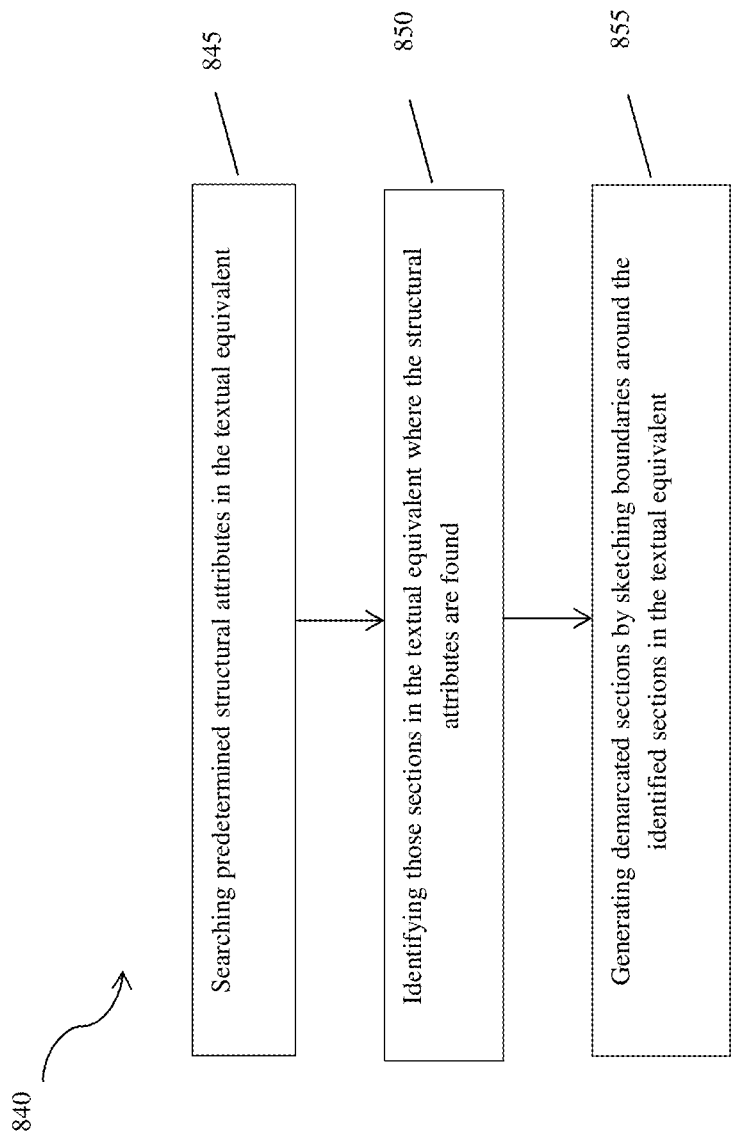
Figure 17:
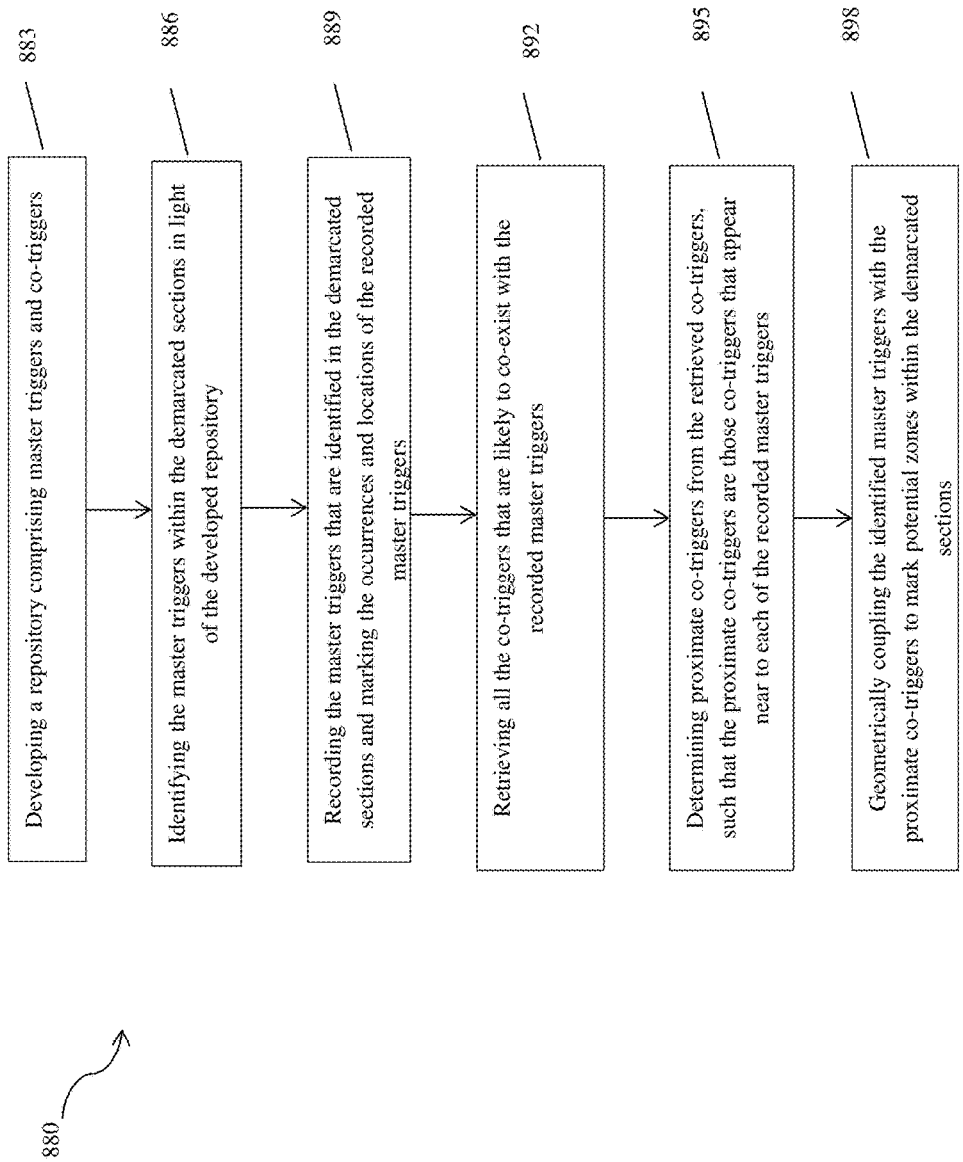
Figure 18:
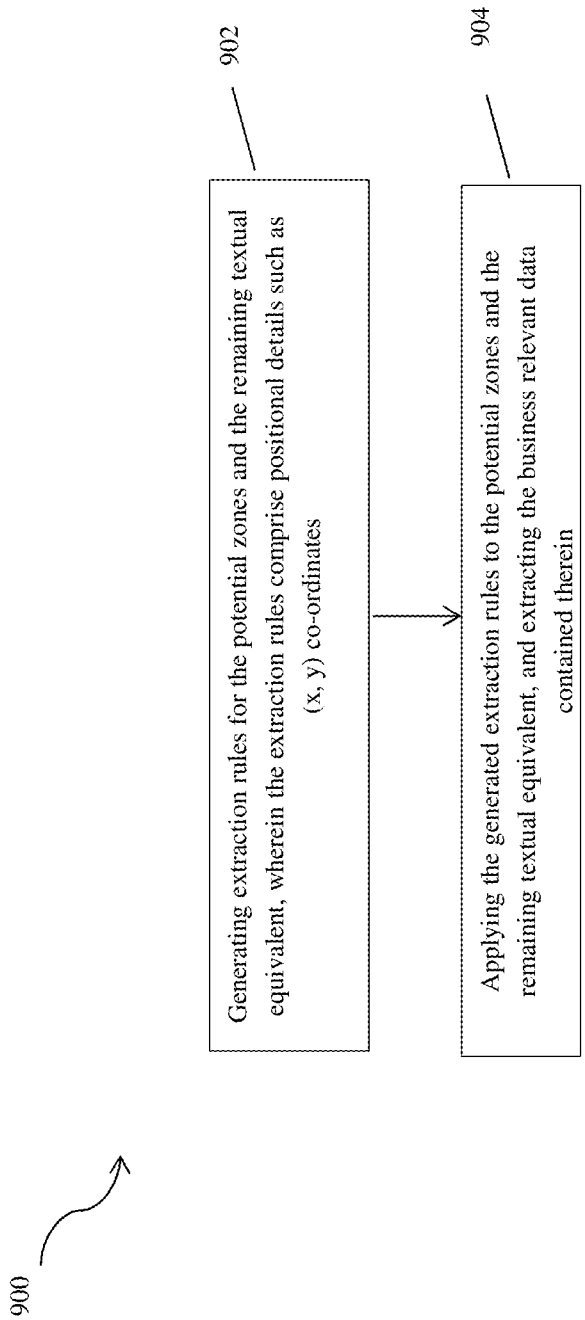
Figure 19:
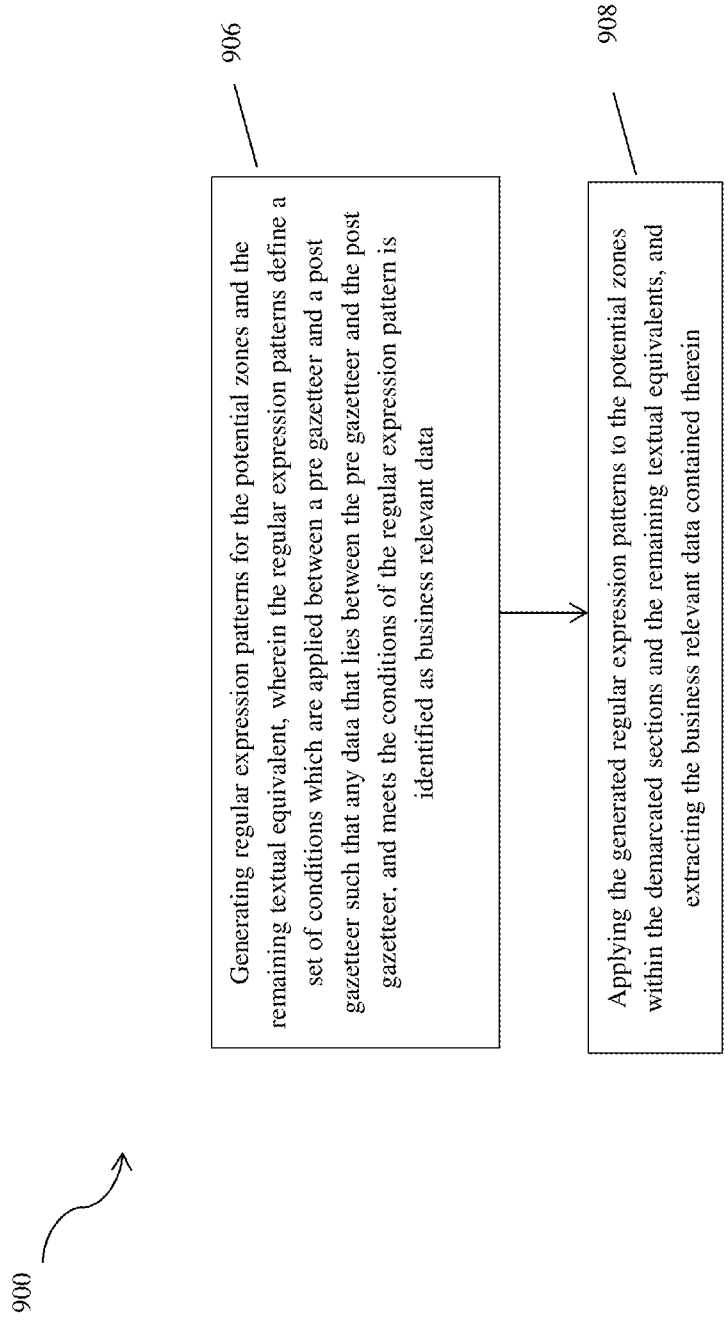
Figure 20:
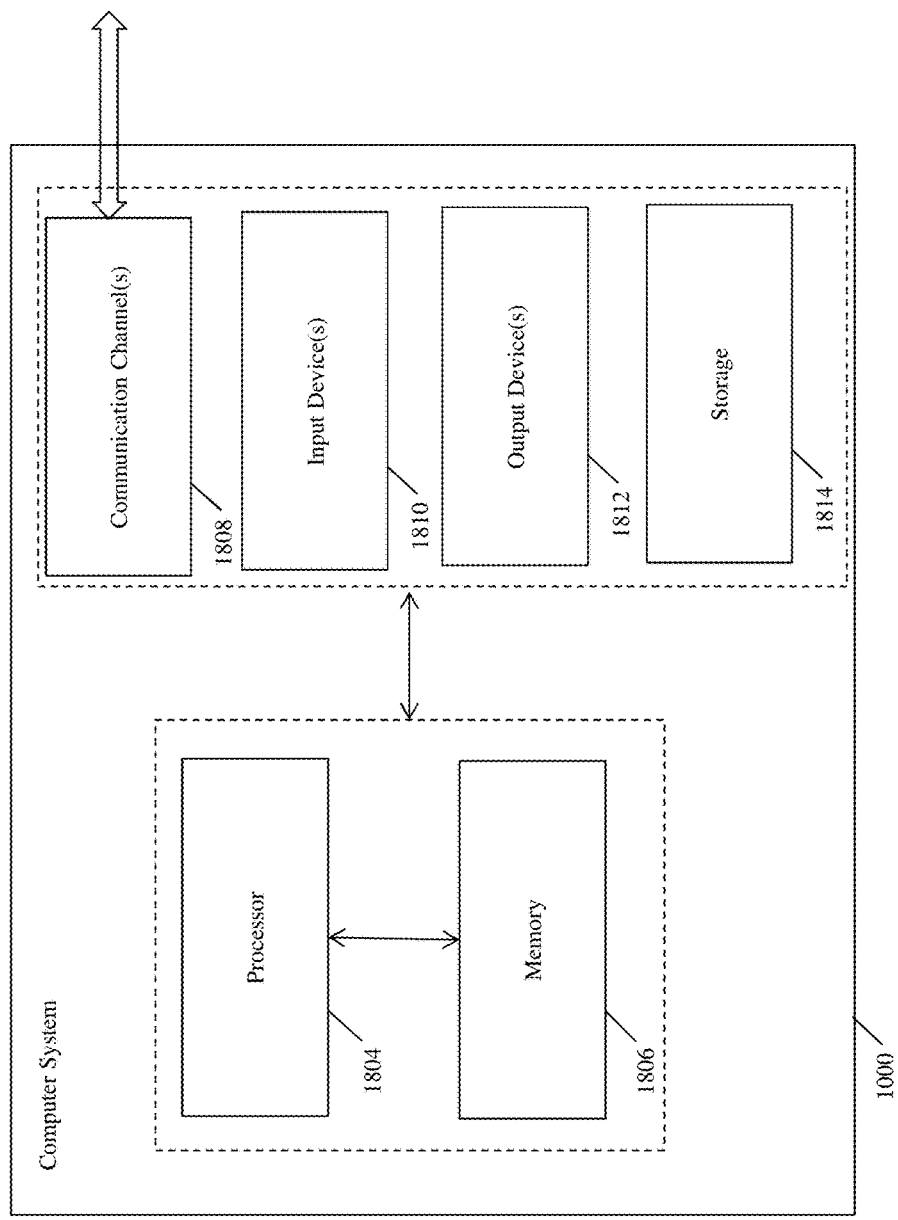

FIG. 16 magnifies upon the step of scanning the textual equivalent and demarcating those sections that correspond to one or more predetermined structural attributes;

FIG. 17 magnifies upon the step of identifying one or more potential zones within the one or more demarcated sections;

FIG. 18 magnifies upon the step of capturing business relevant data using a co-ordinate based extraction technique;

FIG. 19 magnifies upon the step of capturing business relevant data using a context based extraction technique; and FIG. 20 illustrates an exemplary computer system in which various embodiments of the present invention may be implemented.

DETAILED DESCRIPTION OF THE INVENTION

The following description with reference to the accompanying drawings is provided to assist in a comprehensive understanding of exemplary embodiments of the invention as defined by the claims and their equivalents. Those skilled in the art would appreciate that the following description is for illustration purpose only and not for the purpose of limiting the invention as defined by the appended claims and their equivalents. Those of ordinary skill in the art will also understand that various changes and modifications of the embodiments described herein may be made without departing from the scope and spirit of the invention.

Additionally, the terms and words used in the following description and claims are not limited to the bibliographical meanings, but, are merely used by the inventor to enable a clear and consistent understanding of the invention. It is to be understood that the singular forms "a," "an," and "the" include plural referents unless the context clearly dictates otherwise.

FIGS. 1 to 20, discussed below, are non-limiting illustrations which may be used to explain and describe the invention disclosed herein. Person skilled in the art will appreciate that the purpose of these figures is to provide clarity on the concepts associated with the various technical embodiments of this invention.

These figures may include block diagrams and/or flow charts and/or other simplistic representations and may not always indicate the real-time operations taking place in the invention. For instance, in this invention, both, the process and the product embodiments make use of textual equivalents (e.g. XML Documents) only. However, it would be very difficult to diagrammatically represent the real-time activities and/or operations that are performed on these textual equivalents. Accordingly, most figures in this disclosure have used graphical entities corresponding to these textual equivalents (such as Check Image), instead of the textual equivalents itself, for the purpose of illustrating any embodiment, associated operations and/or activities, and outcomes thereof.

Figure 1:
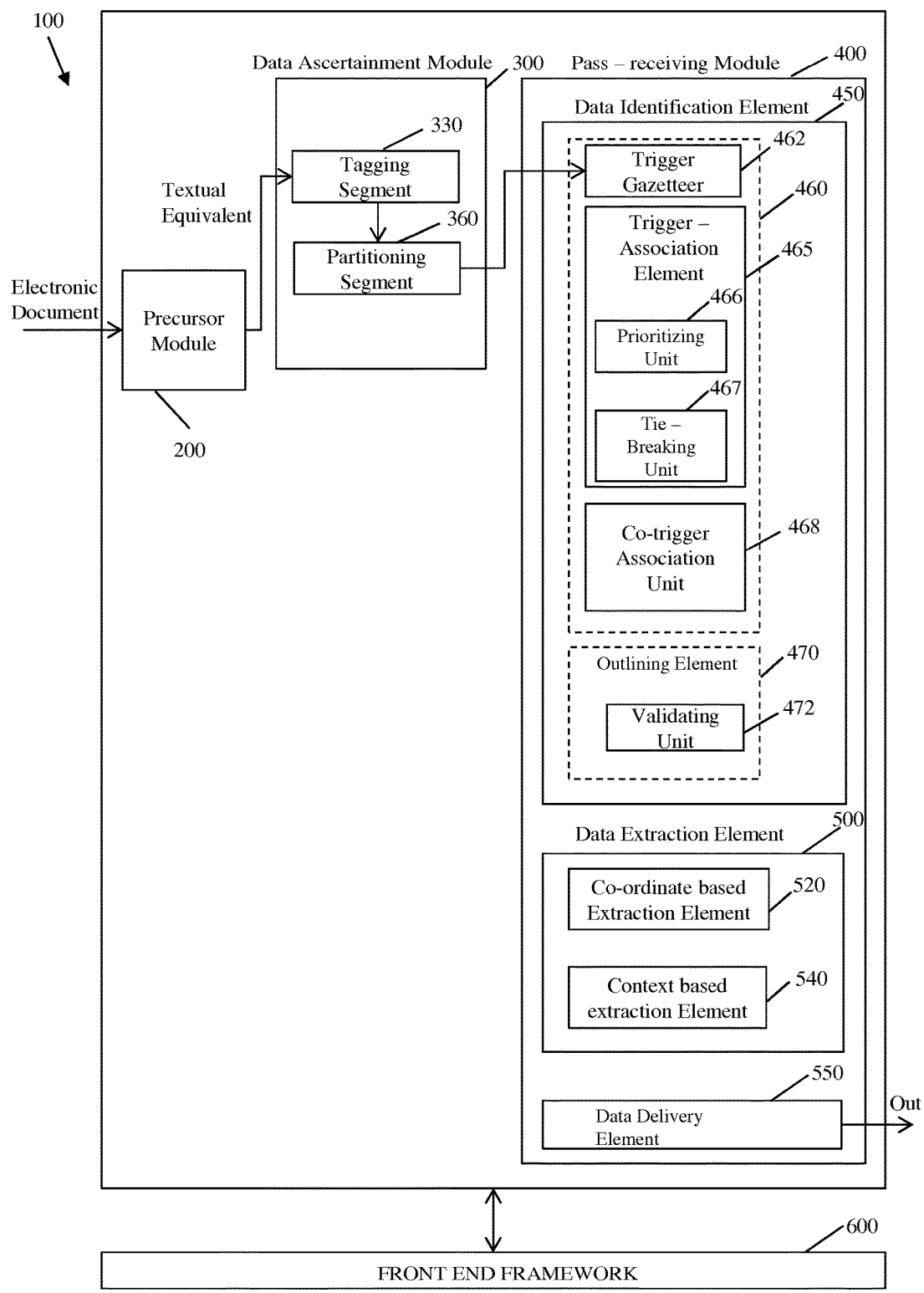
FIG. 1 illustrates a high-level block diagram of a preferred embodiment of the claimed system.

FIG. 1 illustrates a high-level block diagram of a preferred embodiment of the claimed system [100]. As indicated in the diagram, said embodiment, largely, comprises a Precursor Module [200] which, in the broadest sense, is configured to receive an electronic document comprising at least one of a structured section or an unstructured section, and convert the electronic document into a textual equivalent; a Data ascertainment Module [300] which, in the broadest sense, is configured to identify and separate out one or more demarcated sections from the textual equivalent; and, a pass-receiving module [400] which, in the broadest sense, is configured to capture the business relevant data from said one or more demarcated sections.

In accordance with FIG. 1, firstly, at least one electronic document is inputted into said Precursor Module [200] and at least one textual equivalent is generated therefrom. From an input point of view, the electronic documents which are moved into the precursor module [200] may consist of at least one of: structured section or unstructured section. The structured sections may include all those sections which are template or format specific i.e. sections that have their contents positioned and affixed in a specific manner at particular locations. Structured sections are not system-readable per se. Examples of structured sections include, but are not limited to, image files (e.g. Snapshots) in *.tiff and *.jpg file formats, uneditable pdfs, locked documents, etc. In contrast, unstructured sections may include all those sections which contain free-flowing content. Examples of unstructured documents include, but are not limited to, editable files (E.g. *.txt and *.doc), editable pdfs, etc. When an electronic document is converted into its textual equivalent then, both, the structured sections as well as the unstructured sections contained in the electronic document are converted into equivalent textual snippets.

From an output point of view, the textual equivalents which are obtained from the Precursor Module [200] possess the following characteristics: (a) they must be in a format which is system-readable, and (b) they should record all the keywords, attributes, properties etc. of the structured and/or unstructured sections contained in the electronic document.

Figure 2:
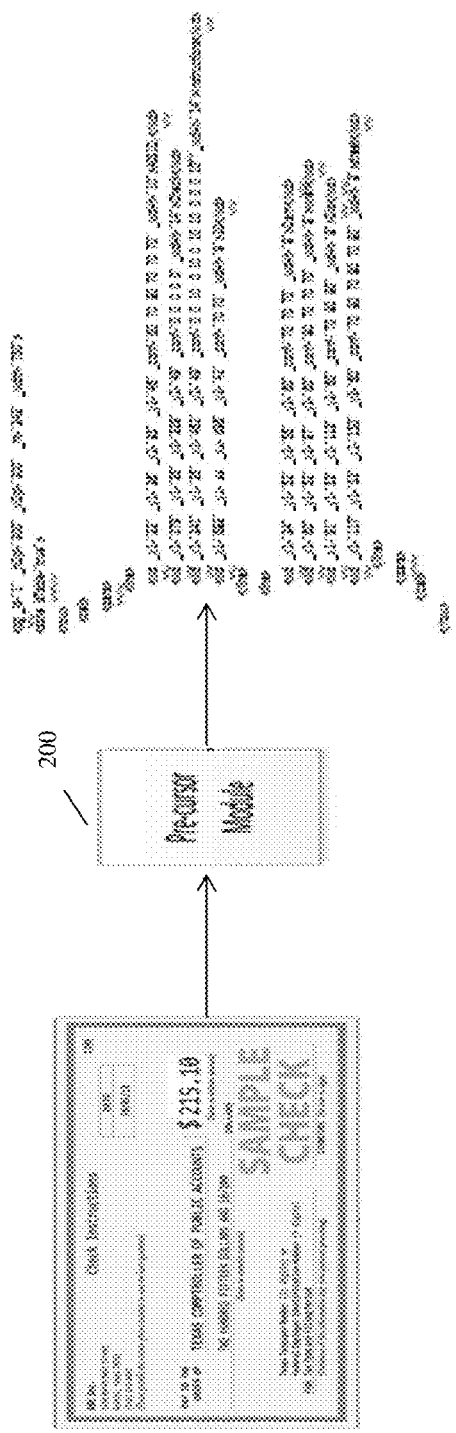
FIG. 2 illustrates a preferred embodiment of the Precursor Module.

FIG. 2 illustrates a preferred embodiment of the Precursor Module [200]. In accordance with said figure, an electronic document (in this case, an image of a Check) is inputted into said Precursor Module [200] and a textual equivalent i.e. an XML Document is generated as an Output. This XML Document qualifies as a textual equivalent because (a) it has meta tags which are system-readable, and, (b) it contains all relevant information of the electronic Document (i.e. Check image) such as Keywords appearing in the Check, Confidence Number (i.e. confidence with which Keywords have been recognized), Co-ordinates of the Keywords etc.

The textual equivalent generated from the precursor module [200] is then, moved into the Data ascertainment Module [300], more particularly, into the tagging element [330]. This tagging element [330] performs a two-fold task. Firstly, it searches for predetermined structural attributes in the textual equivalent. These predetermined structural attributes play a key role in identifying those textual snippets from within the textual equivalent that correspond to the one or more structured sections. This task of the tagging element [330] may be better understood through the following example. Suppose an electronic document, inter alia, contains a structured section such as an image of a Check. In this case, after passing through the precursor module [100], a XML Document would be generated which, inter alia, would contain a textual snippet corresponding to that Check. The task of the tagging element [330] would now be to identify this textual snippet from the XML Document. In order to identify the said snippet, the tagging element [330] would search for structural attributes such as the template details of the check and/or the Owner of the Check and/or any other attributes which may be useful in identifying the textual snippet corresponding to that Check. Wherever these structural attributes are found, then that portion of the XML Document would be identified as relevant XML Snippet. In an analogous example, where the electronic document contains structured representation of Invoices/Bills then the tagging element [330] may operate in a similar manner by considering structural attributes such as the form type of the invoice and/or the name of the owner of the invoice. Therefore, summarily stating, the purpose of searching these structural attributes is to identify those relevant textual snippets which are identifiable with the structured sections in the electronic document.

The following is a real-time example to illustrate the aforementioned working of the precursor module. Suppose on searching the predetermined structural attributes in the textual equivalent, the template type (E.g. Check Template) and the Owner Name (say ABC Bank) are found in a particular textual snippet within the textual equivalent then that textual snippet would become identifiable with the image of that Check.

The second task performed by the tagging element [330] is that it generates one or more demarcated sections by sketching boundaries around the textual snippets, so identified. This task is pivotal as it clearly identifies the metes and bounds of the textual snippet representing a structural section. This clear identification of boundaries of the textual snippet plays a significant role in carrying out further analysis and subsequent capturing of business data in a more efficient manner.

Figure 3:
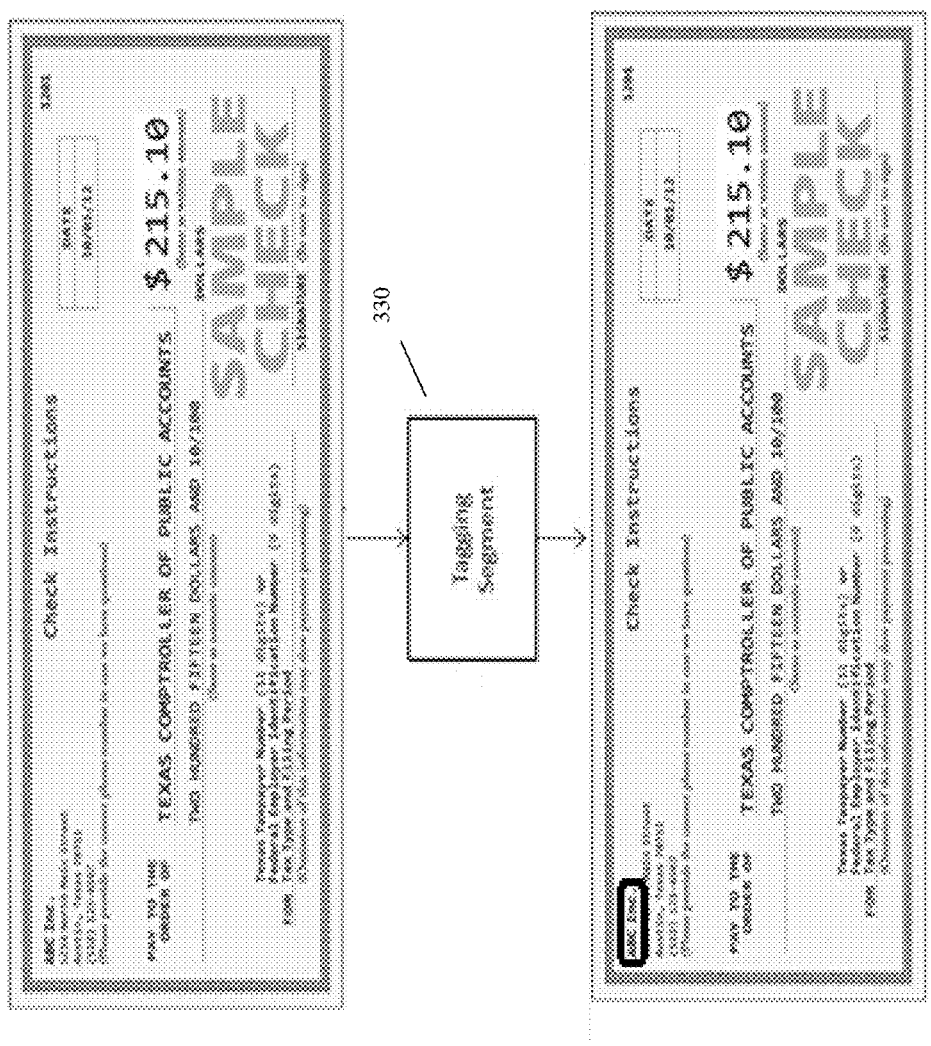
FIG. 3 is an exemplary illustration of the functioning of the tagging element.

FIG. 3 is an exemplary illustration highlighting the function of the tagging element [330]. As shown in said Figure, an image of a Check is inputted and an image of a Check with encircled relevant predetermined structural attributes is received as an input (i.e. encircled "ABC Bank"). In real-time, this figure is indicative of a transformation wherein, a textual equivalent (i.e. XML Document) corresponding to an image of a Check, is inputted in the Tagging Element [330]. The Tagging Element [330] peruses through the contents of the XML Document and searches for the predetermined structural attributes such as the template type (E.g. Check Template) and the Owner Name (say ABC Bank), so as to identify the textual snippet that corresponds to the Check image. Once these relevant textual snippets are identified, clear boundaries are drawn around these textual snippets to obtain the demarcated sections.

Once the demarcated sections are identified in the tagging element [330], the textual equivalent is then moved into the second component within the Data Ascertainment Module [300] i.e. the partitioning element [360]. This partitioning element [360] receives the proceeds of the said tagging element [330] i.e. textual equivalent with one or more identified demarcated sections, and logically separates the demarcated sections from the textual equivalent. This way, two distinct inputs are obtained, namely, the one or more demarcated sections corresponding to the structured sections and the remaining textual equivalent corresponding to the unstructured sections. Person skilled in the art will appreciate that in this context, logical separation means that separation which makes the components, so separated, distinctly identifiable at software level. Said separation does not show any results in real-time/physical environment.

Figure 4:
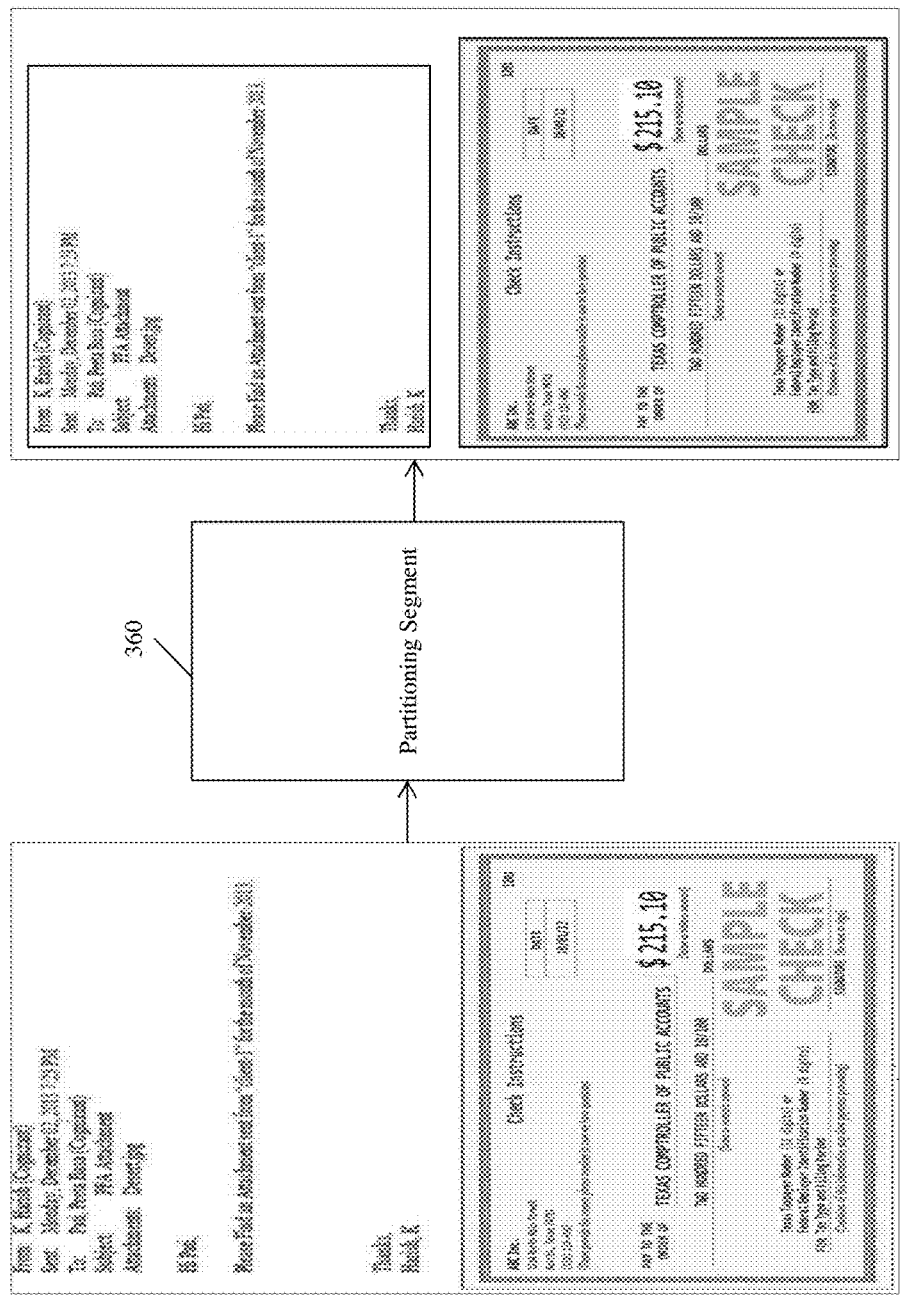
FIG. 4 is an exemplary representation of the transformation that takes place in the partitioning element.

FIG. 4 is an exemplary representation of the transformation that takes place in said partitioning element [360]. This figure shows that a composite document comprising an unstructured section (i.e. text content) and a structured section (i.e. image of a Check) is pushed into the partitioning element [360] and the logically separated sections are received as an output. In real-time this is indicative of a transformation wherein a textual equivalent i.e. XML Document is inputted into the Partitioning Element [360]. From the said textual equivalent, the demarcated section i.e. XML Snippet corresponding to the image of a Check is logically separated out from the remaining XML Document. This way we get the demarcated section and the remaining XML Document as two distinct inputs.

The proceeds of said Partitioning Element [360] i.e. the one or more demarcated sections and the remaining textual equivalent are then moved into the pass-receiving module [400], as distinct inputs. Particularly, within the pass-receiving module, the said distinct inputs are first moved into the data identification element [450] which, in turn, comprises a trigger element [460] and an outlining element [470].

In order of workflow, the proceeds of the partitioning element [360] i.e. the one or more demarcated sections and the remaining textual equivalent are first inputted into the trigger element [460]. The trigger element [460], in turn, comprises multiple components. Firstly, this trigger element [460] comprises a trigger gazetteer [462] which, essentially, is a repository of (a) words or phrases having high probability of appearing within the boundaries of a given demarcated section (hereinafter referred to as "master triggers"), and (b) words or phrases which are likely to appear in the neighborhood of said master triggers (hereinafter referred to as "co-triggers"). This Trigger gazetteer [462] may be varied according to the context and scope of usage.

FIG. 5 illustrates a sample trigger gazetteer [462] for a case where the demarcated section corresponds to an image of a Check. As may be seen in the figure, said gazetteer [462] enlists various master triggers and co-triggers. Amongst the entries in the gazetteer [462], all those words and/or phrases which are likely to be present in all checks have been labeled as master triggers. These master triggers are retrieved from "minimum common business practices" and/or "industry standards" which have been developed in this domain. For instance, the word "PAY" has been indicated as a master trigger in the said Trigger Gazetteer [462]. This is because the word "PAY" has been accepted, by way of common practice, as being an integral and indispensable part of all Checks.

The other class of entries in a trigger gazetteer [462] is that of co-triggers. As stated earlier, co-triggers are words or phrases which are likely to appear in the neighborhood of said master triggers. For instance, it is well known that the word "PAY" is generally followed by the amount to be paid, followed by "DOLLARS" (or any other currency such as "RUPEES"—depending on jurisdiction); If it were to be seen as a string on the Check then it would appear as ("PAY"_One Hundred and Fifty_"DOLLARS"). Thus, it is only logical to deduce that "DOLLARS" or its variants such as "dollar" or "Dollar" are highly likely to be co-triggers for the master trigger "PAY". For said reason "DOLLARS" has been indicated as a co-trigger in FIG. 5.

Secondly, the trigger element [460] comprises a trigger association element [465]. Said trigger association element [465] scans through the demarcated sections and searches for all the master triggers enlisted in said trigger gazetteer [462]. In case there is a hit i.e. a master trigger listed in the trigger gazetteer [462] is found in the demarcated sections then said master trigger is marked and its position is recorded.

Figure 6:
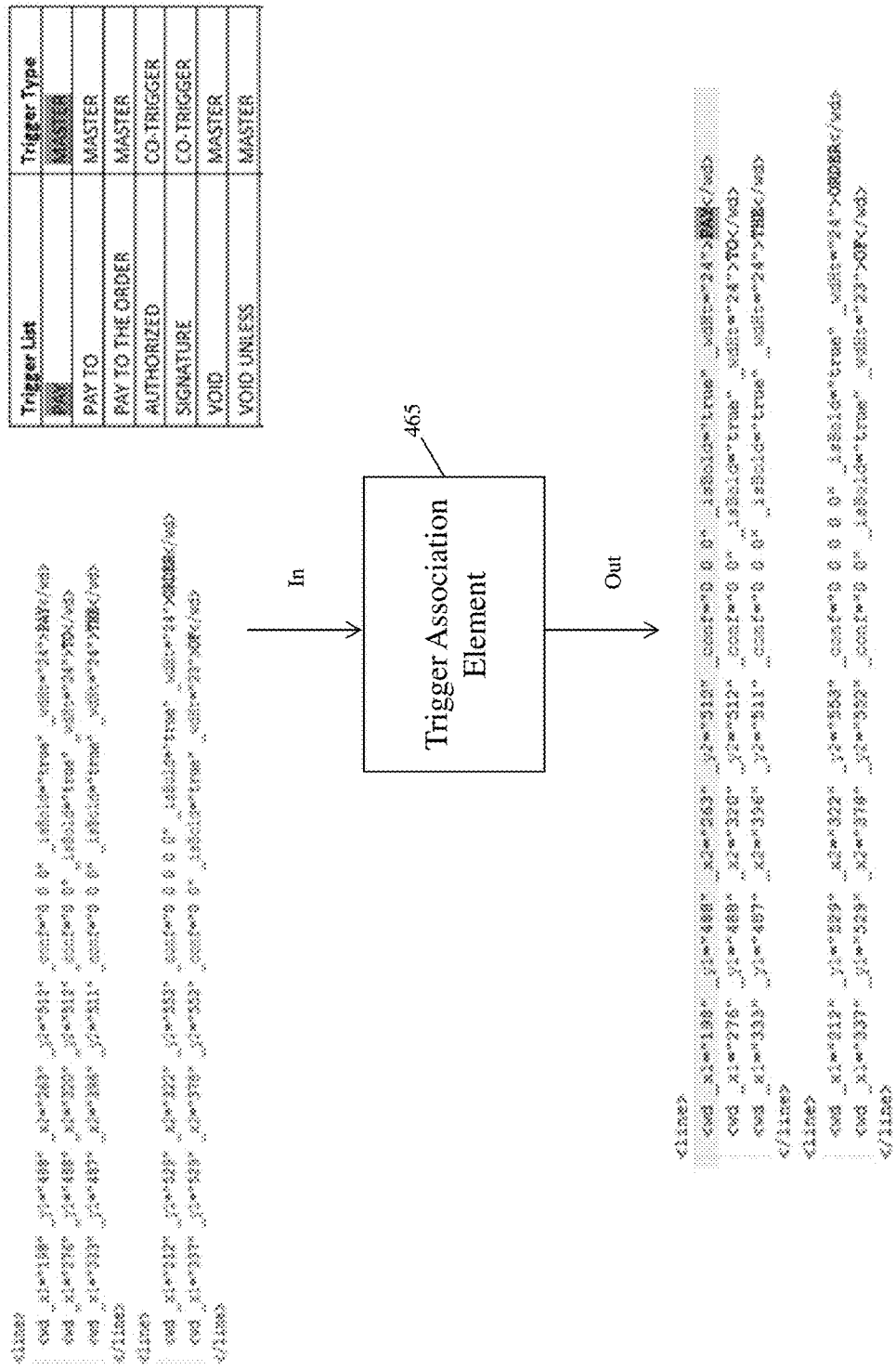
FIG. 6 is an exemplary illustration showing the functioning of the trigger association element.

FIG. 6 is an exemplary illustration showing the functioning of said trigger association element [465]. In said figure it may be seen that a demarcated section corresponding to an image of a Check is inputted to a trigger association element [465]. Post-inputting, said trigger association element [465] scans the contents of the demarcated section and identifies those master triggers which are listed in the trigger gazetteer [462]. Accordingly, said trigger association element [465] identifies that the master trigger "PAY" is present in both, the trigger gazetteer [462] as well as the demarcated section. The said trigger association element [465], therefore, highlights the master trigger "PAY" on the demarcated section and delivers it as an output.

The aforementioned is a preliminary description of a trigger association element [465]. In more sophisticated embodiments, said trigger association element [465] may comprise a prioritizing unit [466] that ranks the master triggers which appear within a demarcated section, and a tie breaking unit [467] that resolves any conflict or ambiguity which may arise due to multiple detection of said ranked master triggers at similar locations/positions. Both, the prioritizing unit [466] and the tie breaking unit [467] use multiple parameters such as surety of appearance within the demarcated section, accuracy with which a master trigger is recognized within the demarcated section (i.e. Confidence Number) etc.

Figure 7:
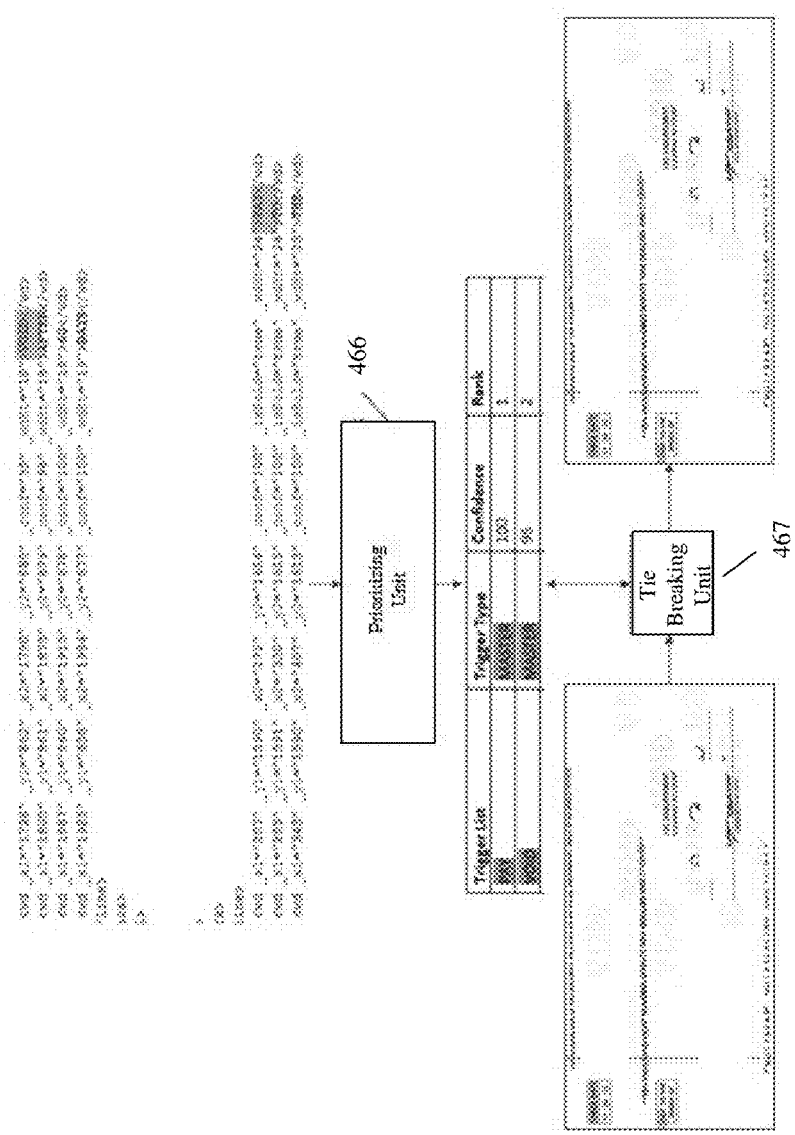
FIG. 7 is an exemplary illustration showing the functioning of the prioritizing unit and the tie breaking unit.

FIG. 7 is an exemplary illustration showing the functioning of said prioritizing unit [466] and tie breaking unit [467]. In accordance with said Figure, once the master triggers "VOID" and "PAY" are identified on the demarcated section corresponding to an image of a Check, said snippet is pushed into the Prioritizing Unit [466]. This prioritizing unit [466] examines said master triggers and ranks them according to their confidence numbers. As seen in FIG. 7, the confidence number for each of said master trigger is mentioned in the XML Snippet viz. "PAY" has a confidence number of 100 while "VOID" has a confidence number of 95. The prioritizing unit [466] develops a tabulation which records the confidence numbers of the identified master triggers and ranks them accordingly. The control then flows to the tie breaking unit [467] that receives said ranked master triggers from the prioritizing unit [466] and uses them to resolve any conflict or ambiguity by removing those said ranked master triggers which have lesser rank.

Thirdly, the trigger element [460] comprises a co-trigger association element [468] that communicatively interfaces with said trigger association element [465]. This co-trigger association element [468] makes use of "co-triggers". As defined earlier, these co-triggers are, essentially, words or phrases which are likely to appear in the neighborhood of said master triggers. The co-trigger association element [468] makes use of said co-triggers and performs a two-fold operation. Firstly, said co-trigger association element [468] retrieves all those co-triggers which are likely to co-exist with each of said master triggers.

FIG. 8 is a sample list of all co-triggers which are likely to exist with the master triggers in a Check. In accordance with FIG. 8, if the Master Trigger is "PAY" then a co-trigger such as "DOLLAR" (or any currency depending on the jurisdiction) would be a co-trigger likely to exist with the said master trigger. Similarly, if the Master Trigger is "PAY TO" then a co-trigger such as "CHECK" or "DOLLAR" (or any currency depending on the jurisdiction) would be the likely co-triggers.

Secondly, the co-trigger association element [468] determines all the proximate co-triggers from amongst the retrieved co-triggers. These proximate co-triggers are those co-triggers that appear in the vicinity of the master triggers that are identified in the demarcated sections.

Figure 9:
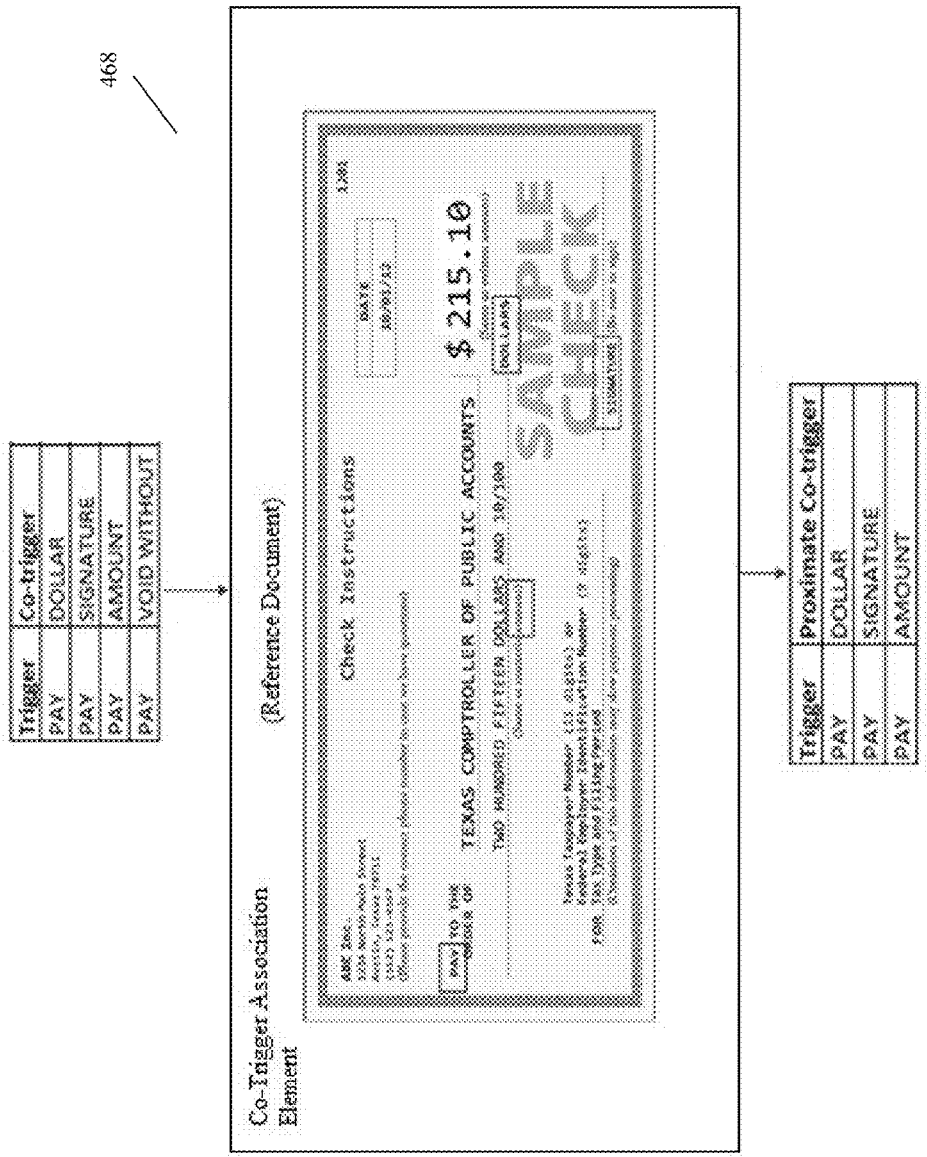
FIG. 9 is a sample illustration depicting the determination of the proximate co-triggers in case of a Check.

FIG. 9 is a sample illustration depicting the determination of said proximate co-triggers in case of Check. As shown in the Figure, all the co-triggers relating to identified master triggers are searched on a Check and only those co-triggers which are found on the Check are recorded and reported as proximate co-triggers. In the figure, these identified proximate co-triggers have been encircled for the purpose of indicating their identification and recording.

The proceeds of the trigger element [460], i.e. the demarcated sections with identified master triggers and proximate co-triggers, are then moved into the other component within the data identification element [450] i.e. the Outlining Element [470]. This outlining element [470] is configured to generate "potential zones". These potential zones are geometric regions within the demarcated sections that precisely indicate the space from where the relevant business data corresponding to the structured sections is extracted.

Figure 10:
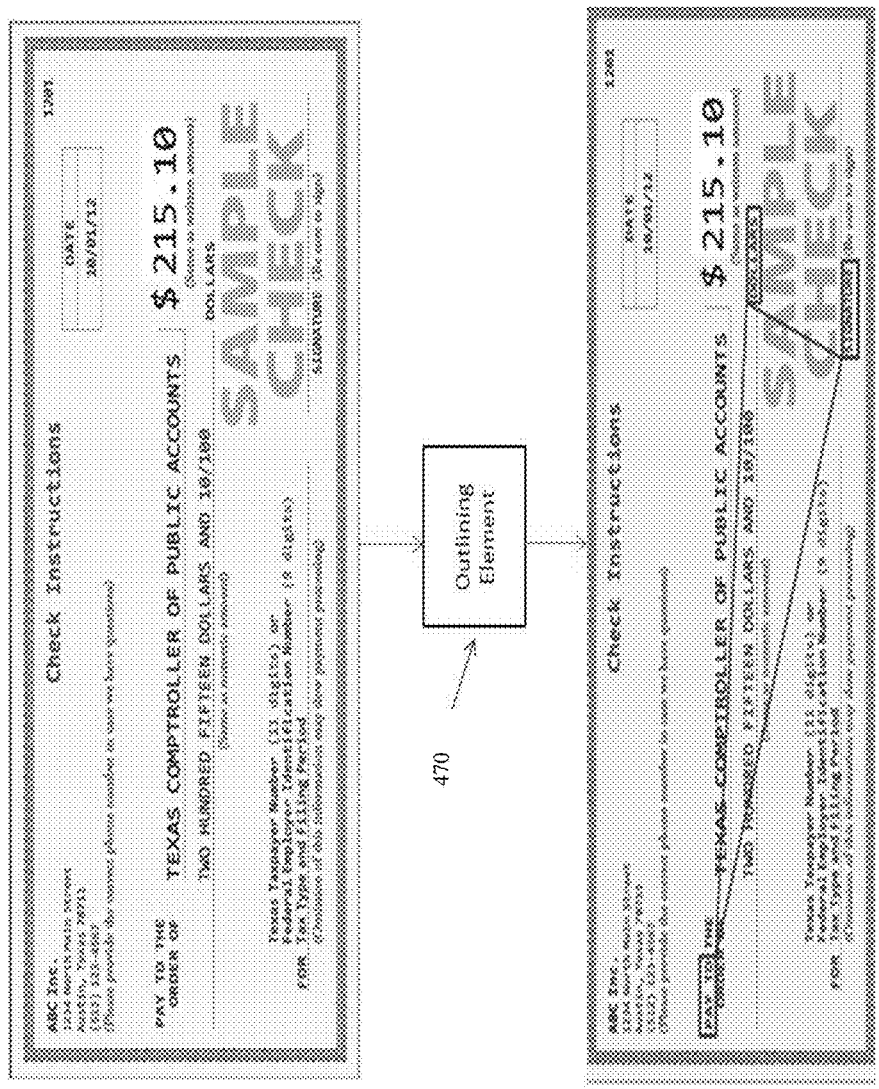
FIG. 10 is a sample representation of the transformation that takes place in said outlining element.

FIG. 10 is a sample representation of the transformation that takes place in said outlining element [470]. In accordance with said Figure, the outlining element [470] accepts a Check with identified master triggers and their corresponding proximate co-triggers, as input. On receiving the input, said element [470] uses at least one mathematical principle to define at least one geometric shape such that geometry so defined has its master triggers and associated proximate co-triggers at its vertices. Accordingly, in FIG. 10, the outlining element [470] uses the master trigger "PAY TO" and the proximate co-triggers "DOLLARS" and "SIGNATURE" and geometrically couples them into a triangular geometry.

The aforesaid paragraph highlights only the fundamental features of an Outlining element [470]. Sophisticated embodiments of an outlining element [470] may include a validating unit [472] that authenticates said potential zone sketched thereof. One way in which said validating unit [472] may work is by performing a two-fold verification i.e. firstly, verifying that said identified master triggers feature in said trigger gazetteer [335], and, secondly, verifying that each proximate co-triggers features in said set of co-triggers.

FIG. 11 is a sample illustration of a validation record generated by said validating unit [472]. As shown in said Figure, Column 1 indicates all master triggers that are identified in the demarcated sections, while Column 2 represents all the proximate co-triggers associated with the identified master triggers. Column 3, on the contrary, represents the outcome of validating the entries of Column 1 and Column 2, i.e. it records the result of (a) verifying that all the master triggers feature within the master gazetteer (First-Fold Verification), and (b) verifying that each said proximate co-trigger features within the set of co-triggers listed in the trigger gazetteer (Second-Fold Verification).

The proceeds of the data identification element [450], more particularly, the Outlining Element [470] are moved into the data extraction element [500]. The data extraction element [500] is configured to capture business relevant data from the potential zones within the demarcated sections and the remaining textual equivalent. This Data extraction element [500] comprises the co-ordinate based extraction element [520] and the context based extraction element [540].

As is obvious, the co-ordinate based extraction element [520] uses location definers such as co-ordinates (x, y, z). Broadly speaking, said element [520] extracts business relevant data by perusing through the co-ordinates of one or more potential zones and/or remaining textual equivalent and pulling out business relevant data committed therein.

Figure 12:
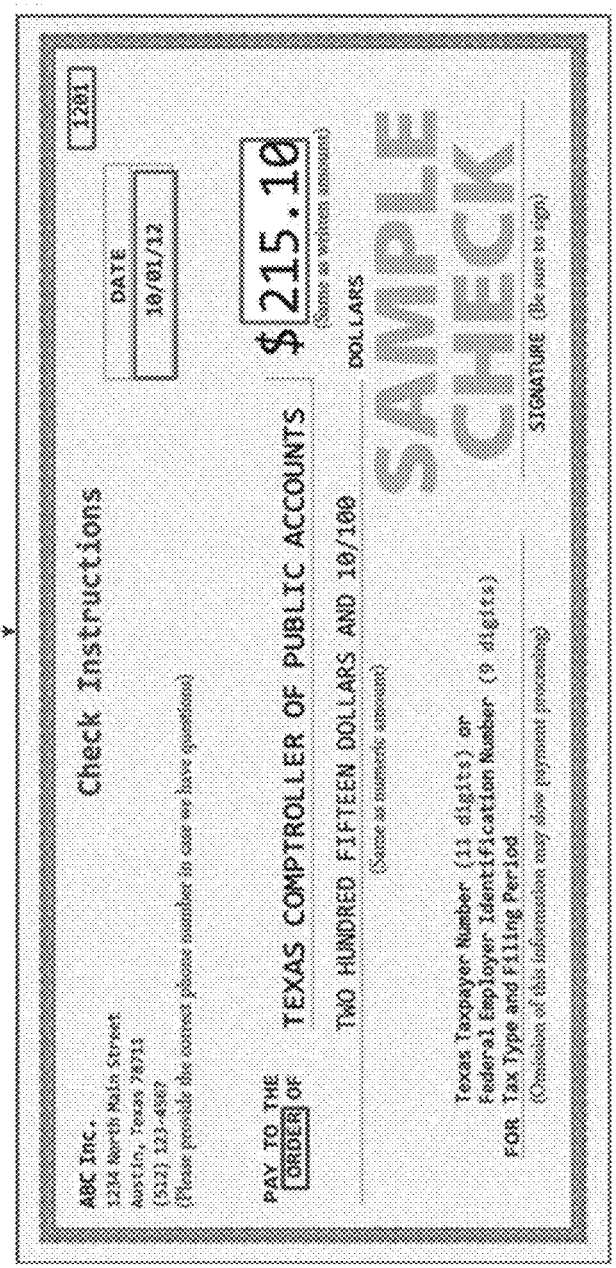
FIG. 12 illustrates an exemplary application of co-ordinate based extraction element for the image of a Check.

FIG. 12 illustrates an exemplary application of co-ordinate based extraction element [520] for the image of a Check. As shown in said figure, co-ordinate based extraction element [520], firstly, develops one or more rules for extraction. In accordance with FIG. 12, each said rule of extraction is enlisted in a tabular fashion. Said tabulation includes various heads which are crucial for the purpose of extraction viz. Template Type, Data Field, Extraction Type, Reference Text and Relative Co-ordinates. Substantiating on said fields, 'Template Type' is indicative of the Template that has been identified with the demarcated section by the tagging element, In light of the Figure, "BANK1" is a code indicating that the template identified with the demarcated section representing the Check, corresponds to a Check issued by ABC Bank. 'Data Field' lists out those fields whose corresponding business relevant data is to be extracted. As shown in said figure, CHECK NO, DATE and AMOUNT are examples of Data Fields on a Check whose corresponding data is to be extracted. 'Extraction Type' is an indicator of the method of extraction i.e. Co-ordinate based or Context based. 'Reference Text' serves as a point of reference in respect of which the positional indicators for a Data Field are identified. The last field is that of 'relative co-ordinates' wherein actual values such as co-ordinates, height-width pairs etc. are stated. After developing said rules, the next step is to execute the said rules and extract data. In light of FIG. 12, the outcome of executing the first rule would be that the co-ordinate based extraction element would place the appropriate Check Template as reference and extract business data corresponding to Data Field "CHECK NO" from a position, relative to the term "ORDER", defined by height (1997), width (443) and co-ordinates (49, 159). Likewise the other rules would extract business data pertaining to "DATE" and "AMOUNT" in a similar fashion. The corresponding business relevant data which would get extracted by executing these rules is also depicted in the diagram.

The other extraction element within said data extraction element [500] is the context based extraction element [540]. Broadly speaking, said element [540] extracts business relevant data by creating one or more rules which in turn, generate at least one regular expression (Reg-Ex). These regular expressions are then conditioned so as to extract the business relevant data.

FIG. 13 shows an exemplary set of rules which are created to define the context for extracting from a Mortgage Document. These rules are very similar to those developed in said co-ordinate based extraction element [520]. However, the difference lies in the fact that instead of Reference Term we define a Pre-Gazetteer and a Post-Gazetteer and instead of Relative Co-ordinates, we define a Reg-Ex Pattern. Said Pre-gazetteer and Post Gazetteer mark the beginning and end, respectively of the string that needs to be perused. The Reg-Ex Pattern, defines the conditions of extraction. In relation to the first rule (first row) tabulated in FIG. 13, the outcome would be that the reg-ex {Pre_Gazetter[space,",:]+ [A-Z,space] {5-100}[space]*Post_Gazetter} would become operational as soon as the words Trustee and/or Beneficiary (Pre Gazetteer) are found and continue to operate until, either, a space is encountered or until 100 characters are scanned (Post Gazetteer). All the content between said Pre Gazetteer and Post Gazetteer that match said reg-ex condition would be extracted as business relevant data. The other rules tabulated in FIG. 13 would apply in a likewise manner.

Figure 14:
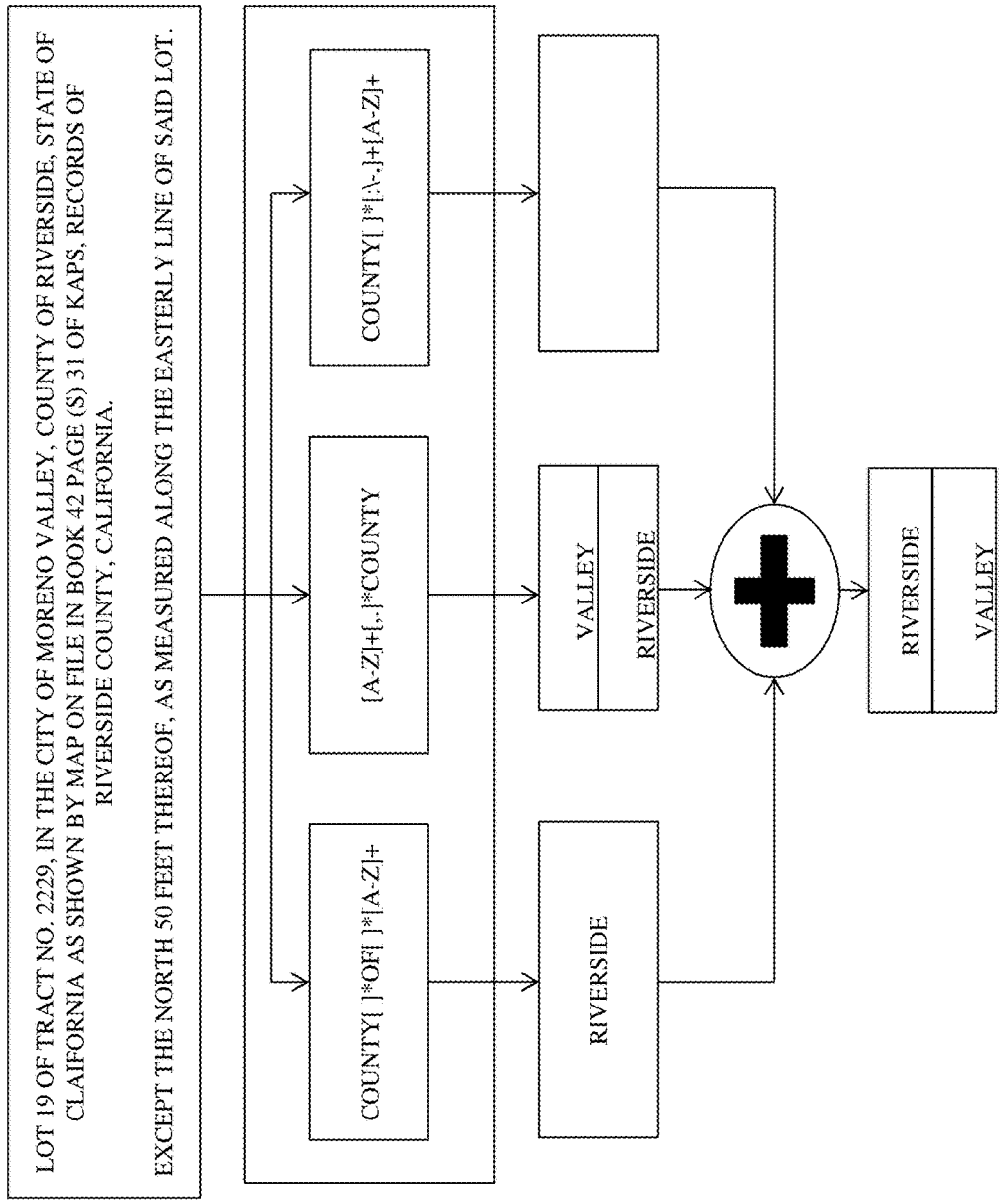
FIG. 14 is an exemplary embodiment of the context based extraction element.

FIG. 14 is an exemplary embodiment of said context based extraction element [540]. In accordance with said Figure, a paragraph from a mortgage deed is taken as an input to said context based extraction element [540]. This paragraph, once inputted into said element [540], is subjected to various reg-ex patterns which are similar in scope. These similarly-scoped reg-ex patterns are used in order to extract data, notwithstanding the structural and contextual changes that may exist in documents due to varying preferences of the drafter. Accordingly, in FIG. 14 the excerpt from the mortgage deed is subjected to various similarly scoped reg-ex patterns i.e. {COUNTY[ ]*OF[ ]*A-Z[ ]+|A-Z+[,.]*COUNTY|COUNTY[ ]*[:\-,]+[A-Z]+}. On applying said reg-ex patterns, ("RIVERSIDE", "VALLEY) and ("RIVERSIDE") are retrieved as business relevant data from the first two reg-ex patterns. The third reg-ex does not generate any data. This extracted data is then stored in a queue and made available to a user who selects that data which he deems relevant and discards the rest. In FIG. 14, accordingly, "VALLEY; RIVERSIDE" is finally selected by the user as being relevant data and all other extracted data is discarded.

The third component within the pass-receiving module [400] is the Data delivery element [550] that helps in delivering said extracted business relevant data in accordance with client's directions. These directions may exist in the form of pre-configured instructions fed to said data delivery element [550] or may be instructions received by said data delivery element [550] at run time (i.e. on-the-fly instructions). Based on these directions, said data delivery element [550] performs one or more actions on the business relevant data extracted thereof. Said actions may include delivering said extracted business data to at least one user through channels including Fax, E-mail, FTP transfer, Sharepoint, Web Services, etc. in a preferable format including .xls, .txt, .csv, .xml, .net etc. Additionally, on receiving appropriate user directions, said delivery element [550] may also store the extracted data in an internal repository for purposes including (a) cleaning up the data and removing discrepancies and/or errors, E.g. removing spelling mistakes (b) arranging the data, in a manner, that suits user's interests, E.g. changing dates from DD/MM/YYYY to MM/DD/YYYY (c) archiving the data (d) taking backup of the data etc.

In a preferred embodiment, the claimed system described in the above paragraphs [100] may be interfaced with a Front End Framework [600] comprising an interactive graphical user interface. This Front End Framework [600] would enable any non-system participant such as a user, to perform one or more operations including (a) visual inspection, supervision and customization of the claimed system [100] and the components therein (b) isolation and diagnosis of any error, discrepancy, conflict, ambiguity or any other problem in the claimed system [100] and said components therein.

Figure 15:
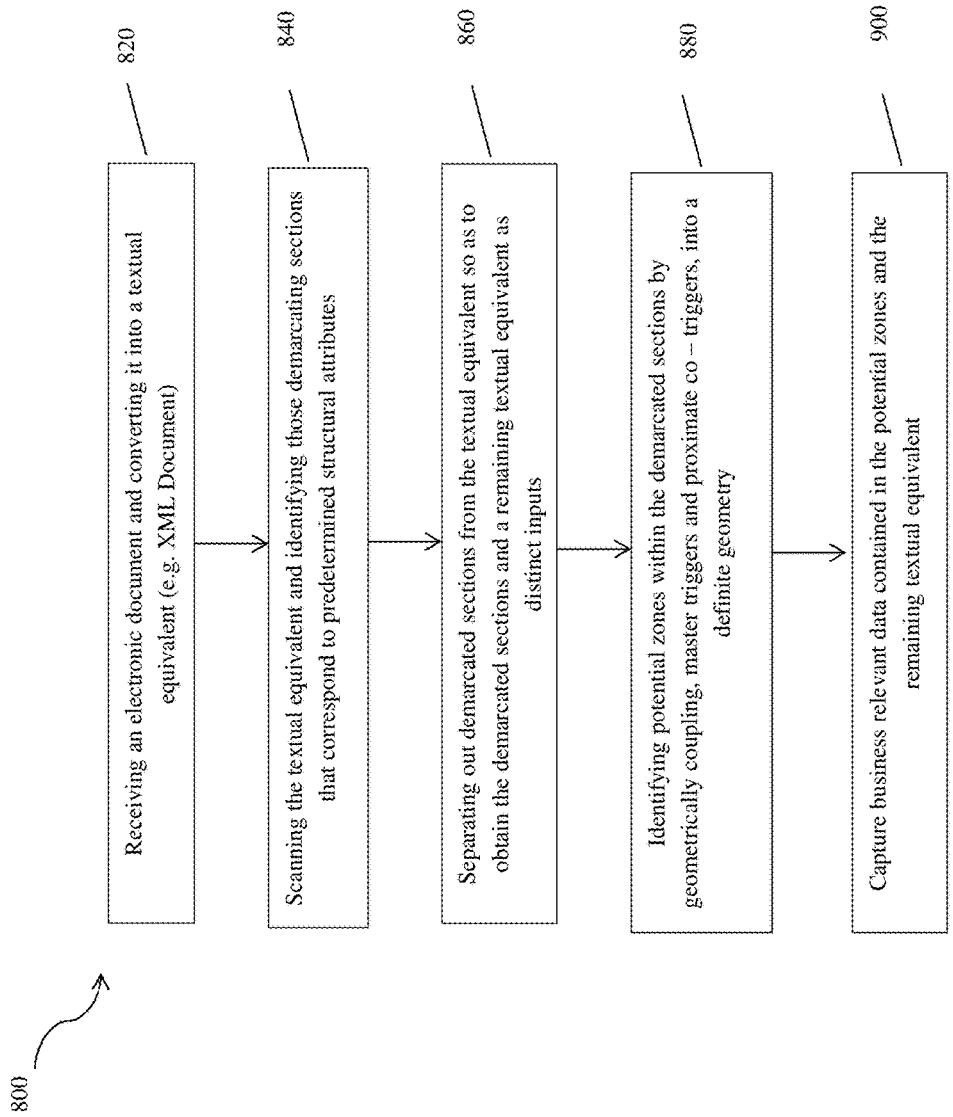
FIG. 15 illustrates a high-level flow chart of a non-limiting, exemplary embodiment of a process for automatic markup conversion.

FIG. 15 illustrates a high-level flow chart of a non-limiting, exemplary embodiment of a process for automatic markup conversion [800]. As may be seen in the figure, this preferred embodiment of the process, largely comprises the steps of (a) receiving an electronic document comprising at least one of: a structured section or a unstructured section, and converting the electronic document into a textual equivalent; [820] (b) scanning the textual equivalent and demarcating those sections that correspond to one or more predetermined structural attributes; [840] (c) separating the one or more demarcated sections from the textual equivalent and retrieving the one or more demarcated sections and a remaining textual equivalent as distinct inputs; [860] (d) identifying one or more potential zones within the one or more demarcated sections by locating one or more master triggers and one or more proximate co-triggers in the demarcated sections and geometrically coupling the located master triggers and proximate co-triggers into the one or more potential zones; [880] and (e) capturing the business relevant data contained in the identified one or more potential zones within the one or more demarcated sections and the remaining textual equivalent [900].

In a preferred embodiment of the step of receiving an electronic document and converting it into a textual equivalent [820], the step may involve receiving a composite electronic document comprising structured as well as unstructured sections and converting it into a XML document comprising one or more XML snippets representing the at least of the structured sections or the unstructured sections.

FIG. 16 magnifies upon the step of scanning the textual equivalent and demarcating those sections that correspond to one or more predetermined structural attributes [840]. In accordance with this figure, the said step of scanning firstly, includes the sub-steps of searching predetermined structural attributes in the textual equivalent [845]. These predetermined structural attributes are indicative of that information which is critical to find those textual snippets in the textual equivalent that correspond to the structured sections in the electronic document. For instance, if the electronic document comprises structured section such as an image of a check then the predetermined structural attributes may include attributes such as template details of the check and the Owner of the Check. Likewise, if the electronic document comprises structured sections such as Invoices/Bills then the predetermined structural attributes may include attributes such as the form type of the invoice and/or the name of the owner of the invoice.

The step of scanning the textual equivalent and demarcating sections, secondly, includes the sub-step of identifying those one or more sections in the textual equivalent where the structural attributes are found [850].

Lastly, the step of scanning the textual equivalent and demarcating sections includes the sub-step of generating one or more demarcated sections by sketching boundaries around the identified one or more sections [855]. This sub-step is pivotal as it clearly identifies the metes and bounds of the textual snippet representing a structural section. This clear identification of boundaries of the textual snippet plays a significant role in carrying out further analysis and subsequent capturing of business data in a more efficient manner.

FIG. 17 magnifies upon the step of identifying one or more potential zones within the one or more demarcated sections [880]. This step comprises the sub-steps of developing a repository to include one or more master triggers and one or more co-triggers, wherein the master trigger is one of: a word and a phrase that has a high probability of appearing within the one or more structured sections and the co-trigger is one of: a word and a phrase that has a high probability of appearing near the master triggers [883]; identifying the one or more master triggers within the one or more demarcated sections [886]; recording the one or more master triggers that are identified in the one or more demarcated sections and marking the occurrences and locations of the recorded one or more master triggers [889]; retrieving the one or more co-triggers, wherein the retrieved one or more co-triggers are those co-triggers that are likely to co-exist with the recorded one or more master triggers [892]; determining one or more proximate co-triggers from the retrieved co-triggers, wherein the proximate co-triggers are those co-triggers that appear near to each of the one or more recorded master triggers [895]; and coupling, geometrically, the one or more identified master triggers with the one or more proximate co-triggers to mark one or more potential zones, wherein the potential zone is indicative of that geometric region within the one or more demarcated sections where the business relevant data is present [898].

The next step in the work flow is that of capturing business relevant data contained in the identified one or more potential zones within the one or more demarcated sections and the remaining textual equivalent [900]. This step of capturing business relevant data may be done either by a co-ordinate based extraction technique or a context based extraction technique.

FIG. 18 magnifies upon the step of capturing business relevant data using a co-ordinate based extraction technique. As may be seen in this figure, capturing business data using a co-ordinate based extraction technique comprises the sub-steps of generating one or more extraction rules for the one or more potential zones within the demarcated sections and the remaining textual equivalent, wherein the extraction rules comprise positional details such as (x, y) co-ordinates [902]; and applying the generated one or more extraction rules to the one or more potential zones within the demarcated sections and the remaining textual equivalent so as to extract the business relevant data contained therein [904].

FIG. 19 magnifies upon the step of capturing data using a context based extraction technique. Said capturing of business data comprises the sub-steps of generating one or more regular expression patterns for the one or more potential zones within the demarcated sections and the remaining textual equivalent, wherein the one or more regular expression patterns define a set of conditions of extraction which are applied between a pre gazetteer and a post gazetteer such that any data which lies between the pre gazetteer and the post gazetteer, and meets the conditions of the regular expression pattern is identified as business relevant data [906]; and applying the generated one or more regular expression patterns to the one or more potential zones within the demarcated sections and the remaining textual equivalent so as to extract the business relevant data contained therein [908].

Lastly, in a preferred method embodiment, the business data, so captured may be subjected to the step of delivering the extracted business relevant data, further wherein the delivering comprises conveying the extracted business relevant data in accordance with one or more predetermined instructions, wherein the predetermined instructions are received from one or more users.

FIG. 20 illustrates an exemplary computer system [1000] in which various embodiments of the present invention may be implemented. The computer system [1000] comprising a processor [1004] and a memory [1006]. The processor [1004] executes program instructions and may be a real processor. The processor [1004] may also be a virtual processor. The computer system [1000] is not intended to suggest any limitation as to scope of use or functionality of described embodiments. For example, the computer system [1000] may include, but not limited to, a general-purpose computer, a programmed microprocessor, a micro-controller, a peripheral integrated circuit unit, and other devices or arrangements of devices that are capable of implementing the steps that constitute the method of the present invention. In an embodiment of the present invention, the memory [1006] may store software for implementing various embodiments of the present invention. The computer system [1000] may have additional components. For example, the computer system [1000] includes one or more communication channels [1008], one or more input devices [1010], one or more output devices [1012], and storage [1014]. An interconnection element (not shown) such as a bus, controller, or network, interconnects the components of the computer system [1000]. In various embodiments of the present invention, operating system software (not shown) provides an operating environment for various software executing in the computer system [1000], and manages different functionalities of the components of the computer system [1000].

The communication channel(s) [1008] allow communication over a communication medium to various other computing entities. The communication medium provides data such as program instructions, or other data in a communication media. The communication media includes, but not limited to, wired or wireless methodologies implemented with an electrical, optical, RF, infrared, acoustic, microwave, blue tooth or other transmission media.

The input device(s) [1010] may include, but not limited to, a keyboard, mouse, pen, joystick, trackball, a voice device or any another device that is capable of providing input to the computer system [1000]. In an embodiment of the present invention, the input device(s) [1010] may be a sound card or similar device that accepts audio input in analog or digital form. The output device(s) [1012] may include, but not limited to, a user interface on CRT or LCD, printer, speaker, CD/DVD writer, or any other device that provides output from the computer system [1000].

The storage [1014] may include, but not limited to, magnetic disks, magnetic tapes, CD-ROMs, CD-RWs, DVDs, flash drives or any other medium which may be used to store data and may be accessed by the computer system [1000]. In various embodiments of the present invention, the storage [1014] contains program instructions for implementing the described embodiments.

The present invention may suitably be embodied as a computer program product for use with the computer system [1000]. The method described herein is typically implemented as a computer program product, comprising a set of program instructions which is executed by the computer system [1000] or any other similar device. The set of program instructions may be a series of computer readable codes stored on a tangible medium, such as a computer readable storage medium (storage [1014]), for example, diskette, CD-ROM, ROM, flash drives or hard disk, or transmittable to the computer system [1000], via a modem or other interface device, over either a tangible medium, including but not limited to optical or analogue communications channel(s) [1008]. The implementation of the invention as a computer program product may be in an intangible form using wireless techniques, including but not limited to microwave, infrared, blue tooth or other transmission techniques. These instructions may be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

In relation to the preceding specification, it is re-iterated that the present disclosure and its advantages have been described with reference to exemplary embodiments and that, a person of ordinary skill in the art would appreciate that various modifications and changes may be made, without departing from the scope of the present disclosure, as set forth in the appended claims and their equivalents. Furthermore, it is re-emphasized that the preceding specification and figures are to be regarded as illustrative examples of the present disclosure, rather than in restrictive sense. All such possible modifications are intended to be included within the scope of present disclosure.

We claim:

1. A system for automatically processing electronic documents, the system comprises:
   a memory comprising programming instructions;
   a processor configured to execute the programming instructions stored in the memory and configured to;
      receive an electronic document comprising at least one of: a structured section or an unstructured section;
      convert the electronic document into a textual equivalent;
      scan the textual equivalent and demarcate those sections that correspond to one or more predetermined structural attributes;
      separate the one or more demarcated sections from the textual equivalent and retrieve the one or more demarcated sections corresponding to the structured sections and a remaining textual equivalent corresponding to the unstructured sections as distinct inputs;
      receive the one or more demarcated sections and the remaining textual equivalent as the distinct inputs;
      identify one or more master triggers within the received distinct inputs;
      generate one or more potential zones with the identified one or more master triggers, wherein the generated one or more potential zones is defined by at least one geometric shape formed by geometrically coupling the master triggers and co-triggers proximate to the master triggers into the geometric shape such that the master triggers and the co-triggers form one or more vertices of the geometric shape;
      generate one or more rules of extraction to determine at least one extraction type from a plurality of extraction types, wherein each of the plurality of extraction types represent a particular method of extraction, based on the type of electronic document, wherein the type of electronic document is ascertainable based on identification of a template type of the electronic document associated with the demarcated section; and
      capture the business relevant data contained in the generated one or more potential zones within the one or more demarcated sections and the remaining textual equivalent based on co-ordinates of the vertices of the geometric shape formed by the one or more master triggers and the co-triggers by applying the determined at least one extraction type.

2. The system of claim 1, wherein the processor is configured to receive the electronic document, and convert the electronic document into a XML, document, further wherein the XML Document comprises of one or more XML snippets corresponding to the at least of: the structured section or the unstructured section.

3. The system of claim 1, wherein the processor is configured to:
   scan the textual equivalent for identification of those textual snippets from within the textual equivalent that correspond to the one or more structured sections, wherein the one or more predetermined structured attributes comprise attributes including type of template and name of owner; and
   generate the one or more demarcated sections based on-boundaries sketched around the identified one or textual snippets.

4. The system of claim 1, wherein the processor is configured to separate the one or more demarcated sections from the textual equivalent and retrieves the one or more demarcated sections corresponding to structured sections and a remaining textual equivalent corresponding to unstructured sections as distinct inputs by logically separating the demarcated sections from the textual equivalent using a partitioning element.

5. The system of claim 1, wherein the processor is configured to:
   identify the one or more co-triggers associated with the one or more master triggers, wherein-the master triggers are at least one of: a word or a phrase that has a high probability of appearing within the one or more demarcated sections, and the co-triggers are at least one of: a word or a phrase that has a high probability of appearing near the master triggers;
   record the identified one or more master triggers that are identified in the one or more demarcated sections and mark occurrences and locations of the recorded one or more master triggers;
   retrieve the one or more co-triggers that are likely to co-exist with the recorded one or more master triggers;
   determine the one or more proximate co-triggers from the retrieved co-triggers, the proximate co-triggers are those co-triggers that appear near to each of the one or more recorded master triggers; and
   couple, geometrically, the one or more identified master triggers with the one or more proximate co-triggers identified to mark the one or more potential zones.

6. The system of claim 5, wherein the identified master triggers are ranked based on one or more predetermined criteria; and conflicts that arise due to detection of the one or more ranked master triggers at multiple locations of the geometric shape are resolved by perusing through the ranks of the one or more ranked master triggers and-retaining only those ranked master triggers which have better ranks.

7. The system of claim 5, wherein the processor is configured to:
   verify presence of the one or more recorded master triggers in the one or more prelisted master; and
   verify presence of the one or more proximate co-triggers in the one or more pre-listed co-triggers.

8. The system of claim 1, wherein the processor is configured to capture the business relevant data contained in the generated one or more potential zones within the one or more demarcated sections, and the remaining textual equivalent by applying the at least one determined extraction type comprising:
   a co-ordinate based extraction element, wherein the co-ordinate based extraction element is configured to:
      generate one or more extraction rules for the one or more potential zones within the demarcated sections and the remaining textual equivalent based on determination of position details including (x, y) coordinates of the one or more vertices of the defined geometric region; and apply the generated one or more extraction rules to the one or more potential zones within the demarcated sections and the remaining textual equivalent, and extract the business relevant data contained therein; or a context based extraction element, wherein the context based extraction element is configured to:

generate one or more regular expression patterns for the one or more potential zones identified by one or more vertices of the defined geometric shape within the demarcated sections and the remaining textual equivalent, wherein the one or more regular expression patterns define a set of conditions of extraction which are applied between a pre gazetteer and a post gazetteer such that any data which lies between the pre gazetteer and the post gazetteer, and meets the conditions of the regular expression pattern is identified as business relevant data; and apply the generated one or more regular expression patterns to the one or more potential zones within the demarcated sections and the remaining textual equivalent, and extract the business relevant data contained therein.

9. The system of claim 8, wherein the processor is configured to:

receive the captured business relevant data; and convey the extracted business relevant data in accordance with the one or more predetermined instructions, wherein the predetermined instructions are received from one or more users.

10. The system of claim 9, wherein said system is configured to interface with a front-end framework that includes an interactive graphical user interface for facilitating the one or more users to perform one or more operations.

11. A computer implemented method for automatically processing electronic documents, the computer implemented method comprising:

receiving an electronic document comprising at least one of: a structured section or unstructured section, and converting the electronic document into a textual equivalent;

scanning the textual equivalent and demarcating those sections that correspond to one or more predetermined structural attributes;

separating the one or more demarcated sections from the textual equivalent and retrieving the one or more demarcated sections corresponding to the structured sections and a remaining textual equivalent corresponding to the unstructured sections as distinct inputs;

identifying one or more master triggers within the received distinct inputs;

generating one or more potential zones within the received distinct inputs, with the identified one or more master triggers, wherein the generated one or more potential zones is defined by at least one geometric shape formed by geometrically coupling the master triggers and co-triggers proximate to the master triggers into the geometric shape such that the master triggers and the co-triggers form one or more vertices of the geometric shape;

generating one or more rules of extraction to determine at least one extraction type from a plurality of extraction types, wherein each of the plurality of extraction types represent a particular method of extraction, based on the type of electronic document, wherein the type of electronic document is ascertainable based on identification of a template type of the electronic document associated with the demarcated section; and capturing the business relevant data contained in the generated one or more potential zones within the one or more demarcated sections and the remaining textual equivalent based on co-ordinates of the vertices of the geometric shape defined by the one or more master triggers and the co-triggers by applying the determined at least one extraction type.

12. The method of claim 11, wherein automatically processing electronic documents comprises, receiving the electronic document and converting the electronic document into a XML document, further wherein the XML Document comprises of one or more XML, snippets corresponding to the at least of the structured sections or the unstructured sections.

13. The method of claim 11, wherein the step of scanning the textual equivalent and demarcating those sections that correspond to one or more predetermined structural attributes comprises:

searching the structural attributes in the textual equivalent, wherein the predetermined structural attributes are used in identifying those textual snippets from within the textual equivalent that correspond to the one or more structured sections, further wherein the one or more predetermined structured attributes comprise attributes including template of a check and form type of an invoice; and generating one or more demarcated sections by sketching boundaries around the identified one or more textual snippets.

14. The method of claim 11, wherein the step of generating one or more potential zones within the one or more demarcated sections comprises:

developing a repository to include the one or more master triggers and the one or more co-triggers associated with the one or more master triggers, wherein the one or more master trigger is one of: a word and a phrase that has a high probability of appearing within the one or more structured sections, and the co-trigger is one of: a word and a phrase that has a high probability of appearing near the master triggers;

recording the one or more master triggers that are identified in the one or more demarcated sections and marking occurrences and locations of the recorded one or more master triggers;

retrieving the one or more co-triggers, wherein the retrieved one or more co-triggers are those co-triggers that are likely to co-exist with the recorded one or more master triggers;

determining the proximate co-triggers from the retrieved co-triggers, wherein the proximate co-triggers are those co-triggers that appear near to each of the one or more recorded master triggers; and coupling, geometrically, the one or more identified master triggers with the one or more proximate co-triggers at the one or more vertices of the geometric shape, to mark one or more potential zones.

15. The method of claim 11, wherein the step of capturing the business relevant data contained in the generated one or more potential zones within the one or more demarcated sections and the remaining textual equivalent by a co-ordinate based extraction technique comprises:

generating one or more extraction rules for the one or more potential zones within the demarcated sections and the remaining textual equivalent based on determination of positional details including (x, y) coordinates of the one or more vertices of the defined geometric shape; and applying the generated one or more extraction rules to the one or more potential zones within the demarcated sections and the remaining textual equivalent, and extracting the business relevant data contained therein.

16. The method of claim 11, wherein the step of capturing the business relevant data contained in the one or more potential zones identified by the one or more vertices of the defined geometric shape within the one or more demarcated sections and the remaining textual equivalent by a context based extraction technique comprises:

generating one or more regular expression patterns for the one or more potential zones within the demarcated sections and the remaining textual equivalent, wherein the one or more regular expression patterns define a set of conditions of extraction which are applied between a pre gazetteer and a post gazetteer such that any data which lies between the pre gazetteer and the post gazetteer, and meets the conditions of the regular expression pattern is identified as business relevant data; and applying the generated one or more regular expression patterns to the one or more potential zones within the demarcated sections and the remaining textual equivalent, and extracting the business relevant data contained therein.

17. The method of claim 11, wherein the step of capturing the business relevant data includes delivering the extracted business relevant data, further wherein the delivering comprises conveying the extracted business relevant data in accordance with one or more predetermined instructions, wherein the predetermined instructions are received from one or more users.

18. A computer program product comprising a non-transitory computer readable medium having a computer readable program code stored thereon, the computer-readable program code comprising instructions that, when executed by a processor, cause the processor to:

receive an electronic document comprising at least one of: a structured section or an unstructured section, convert the electronic document into a textual equivalent;

scan the textual equivalent and demarcate those sections that correspond to one or more predetermined structural attributes; and separate the one or more demarcated sections from the textual equivalent and retrieve the one or more demarcated sections corresponding to the structured sections and a remaining textual equivalent corresponding to the unstructured sections as distinct inputs;

receive the one or more demarcated sections and the remaining textual equivalent as the distinct inputs;

identify one or more master triggers within the received distinct inputs;

generate one or more potential zones within the received distinct inputs with the identified one or more master triggers, wherein the generated one or more potential zones is defined by at least one geometric shape formed by geometrically coupling the master triggers and co-triggers proximate to the master triggers into the geometric shape such that the master triggers and the co-triggers form one or more vertices of the geometric shape;

generate one or more rules of extraction to determine at least one extraction type from a plurality of extraction types, wherein each of the plurality of extraction types represent a particular method of extraction, based on the type of electronic document, wherein the type of electronic document is ascertainable based on identification of a template type of the electronic document associated with the demarcated section; and capture the business relevant data contained in the generated one or more potential zones and the remaining textual equivalent based on co-ordinates of the vertices of the geometric shape defined by the one or more master triggers and the co-triggers by applying the determined at least one extraction type.

\* \* \* \* \*